April 7, 1936. G. W. POPPE Re. 19,921

PAPER BAG AND PROCESS AND MACHINE FOR MAKING SAME

Original Filed Nov. 1, 1928 5 Sheets-Sheet 1

INVENTOR
GEORGE W. POPPE
BY Howell & Spencer
ATTORNEYS

April 7, 1936. G. W. POPPE Re. 19,921

PAPER BAG AND PROCESS AND MACHINE FOR MAKING SAME

Original Filed Nov. 1, 1928 5 Sheets-Sheet 2

INVENTOR
GEORGE W. POPPE
BY
Newell & Spencer
ATTORNEYS

April 7, 1936. G. W. POPPE Re. 19,921
PAPER BAG AND PROCESS AND MACHINE FOR MAKING SAME
Original Filed Nov. 1, 1928 5 Sheets-Sheet 3
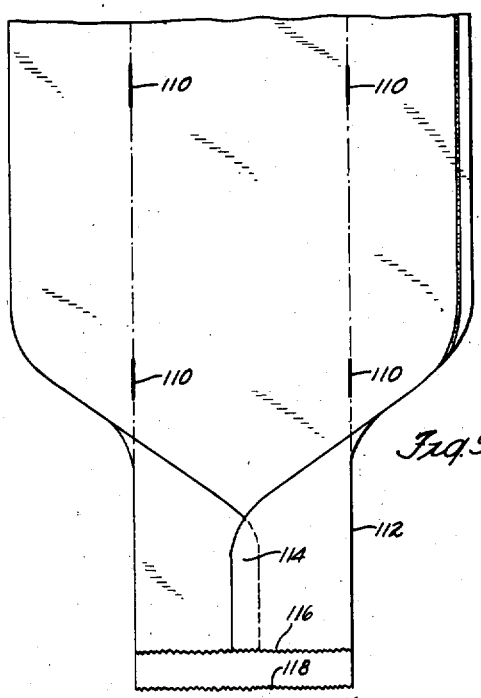
Fig. 9.
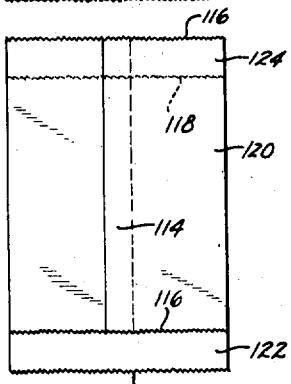
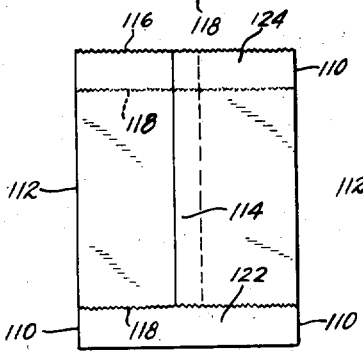
Fig. 10
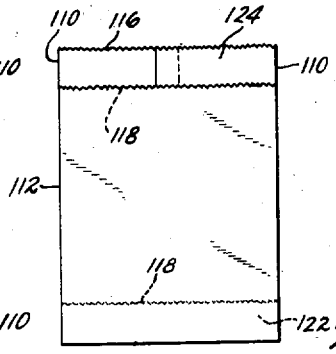
Fig. 4
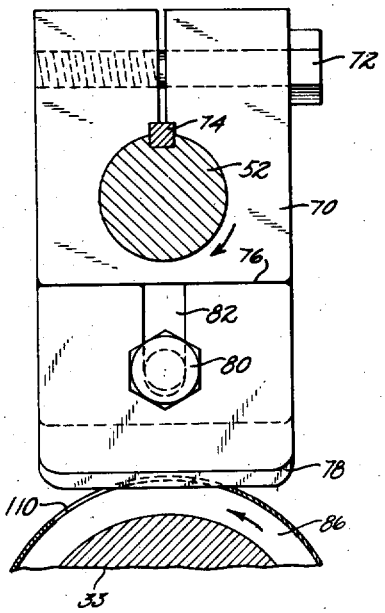
Fig. 5.
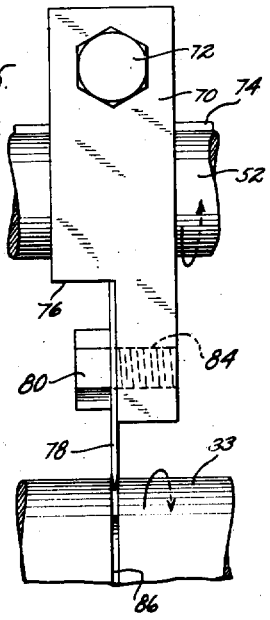
INVENTOR
GEORGE W. POPPE
BY
Newell & Spencer
ATTORNEYS

PAPER BAG AND PROCESS AND MACHINE FOR MAKING SAME

Original Filed Nov. 1, 1928 5 Sheets-Sheet 4

INVENTOR
GEORGE W. POPPE
BY Newell & Spencer
ATTORNEYS

PAPER BAG AND PROCESS AND MACHINE FOR MAKING SAME

Original Filed Nov. 1, 1928 5 Sheets-Sheet 5

INVENTOR
GEORGE W. POPPE
BY Newell W. Spencer
ATTORNEYS

Reissued Apr. 7, 1936 Re. 19,921

UNITED STATES PATENT OFFICE 19,921

PAPER BAG AND PROCESS AND MACHINE FOR MAKING SAME

George W. Poppe, Brooklyn, N. Y., assignor to Equitable Paper Bag Co., Inc., a corporation of New York Original No. 1,798,168, dated March 31, 1931, Serial No. 316,462, November 1, 1928. Application for reissue June 4, 1935, Serial No. 24,843

18 Claims. (Cl. 93—19)

The present invention pertains to new and useful improvements in receptacles made of paper, and more specifically the invention includes a new and improved paper bag of the type having a closing lip or flap and to a new and novel machine and method of manufacture thereof.

In the practical art of bag manufacture, a distinction is made between what are known as bags and what are known as envelopes, due to the process and machines for making the two separate types of receptacles. Envelopes, in the practical art, are formed in such a way that the flaps closing the envelope are a continuation of the web from which the envelope is formed but both flaps fold on the same side of the completed article.

Paper bags, on the other hand, are formed by folding a web of paper longitudinally to form a tube-like structure which is severed into predetermined lengths to form a bag, one flap of which is a prolongation of the upper portion of the tube-like structure while the other flap is a prolongation of the other or opposite portion. In such a bag the free or closing flap contains a portion of the seam due to the fold.

The severing of the paper bags from the tube-like structure is accomplished by a so-called chopping action which consists in holding the tube-like structure under tension and in engagement with the cutting edge of suitably arranged knives in which position the tube-like structure is subjected to a sudden blow, the impact of which serves to sever it along its line of engagement with the knives.

So far as I am aware, in all bags of the type above mentioned, the outer edge of the closing lip or flap is continuous and when the closing lip or flap is folded to bag-closing position it does not sufficiently overlap the body of the bag corners to afford the necessary protection to the bag contents, nor do such bags present as good an appearance as when the flaps are longer, as in envelopes. Bags of this type therefore cannot be used for containing articles which it is desired to protect from dust, etc., since dust finds its way to the interior of the bag through the portions of the bag mouth which are not always completely closed by the closing lip or flap.

It has heretofore been the practice when it is desired to protect articles from dust, etc. to use envelopes in which the closing lip or flap forms an effective dustproof closure. Receptacles of this type, however, are expensive due to waste incident to their method of manufacture and to the relatively slow operation of the machines by which they are made and the cost of these envelopes, which is considerably greater than that of paper bags, prohibits their use except for certain types of merchandise.

It is one of the objects of the present invention to provide a paper bag having a closing flap of the same length and similar in shape to that of an envelope, but which can be produced as rapidly as an ordinary paper bag.

It is a further object of the invention to provide a novel mechanism for use in connection with standard machines for forming paper bags of the closing lip type, whereby the new and improved bag may be formed on such machines without in any manner affecting the operation of the machine.

With the above and other objects in view which will appear as the nature of the invention is better understood, the invention consists broadly in slitting die-cutting a web of paper at oppositely disposed points in the width thereof, and at predetermined intervals in the length thereof, suitably folding the web to form a substantially tube-like structure and subsequently subjecting the folded tube-like structure to the aforementioned chopping operation to sever it transversely along lines which meet the ends of the slits. Forming paper bags in the above described manner provides a closing lip or flap for a bag, of the same desirable type heretofore employed in envelopes and which, when folded to closing position forms a complete closure for the bag which is effective against the entrance of dust and undesirable foreign matter.

While in the present illustration of the invention, the slits or cuts formed in the web are positioned at an angle of approximately 20° to the longitudinal axis of the web, this angle may be increased or decreased as desired and in some instances the slits may be formed parallel to the longitudinal axis of the web. Furthermore the slits may be formed either by a so-called slitting mechanism or they may be die-cut, and it is to be understood that the invention is not limited to any precise angle of slits or to any particular manner of forming them.

With the above and other objects in view, the invention consists in certain novel features hereinafter described, and particularly pointed out in the claims, the advantages of which will be readily understood and appreciated by those skilled in the art to which the invention pertains.

The invention will be clearly understood from the accompanying drawings which illustrate the invention in a preferred form and the following detailed description of the construction therein shown.

In the drawings—

Figure 4 is a detail view partly in section of a slitting mechanism;

Figure 5 is a similar view taken at right angles to Figure 4;

Figure 9 is a plan view of web of paper, said view showing the manner in which the web is folded longitudinally and also showing the web formed with straight slits, parallel to its longitudinal axis, and severed transversely into bag lengths;

Figure 10 is a reverse face view of a bag length formed in accordance with the showing of Figure 9;

Figure 16:
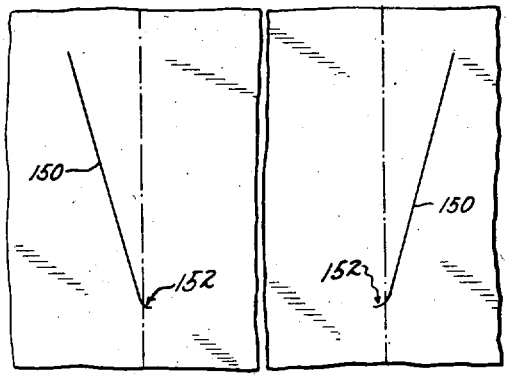
Figure 16 illustrates another type of slit formed in the web.
Figure 18:
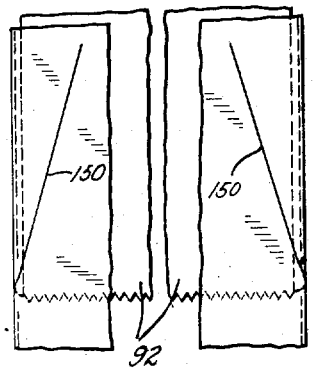
Figure 17:
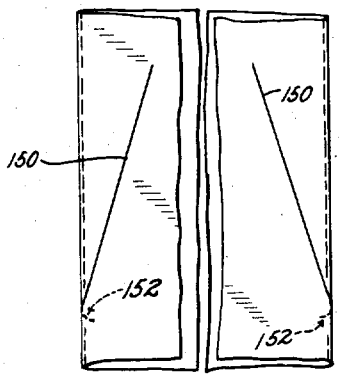
Figure 19:
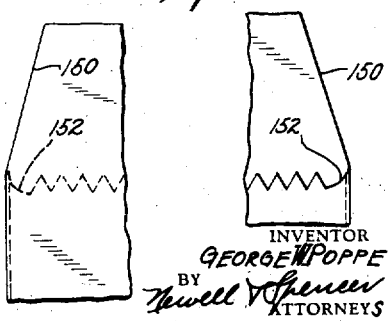

Figures 17 to 19 inclusive illustrate the manner in which a paper bag is formed from a web of paper slit in accordance with the showing of Figure 16.

It is to be understood that the process of making my improved bag may be carried out in different ways. I have, however, for purpose of illustration, shown the invention as being performed with a bag machine of usual construction, which known machine is suitably modified to enable it to be used to produce my improved bag.

Figure 1:
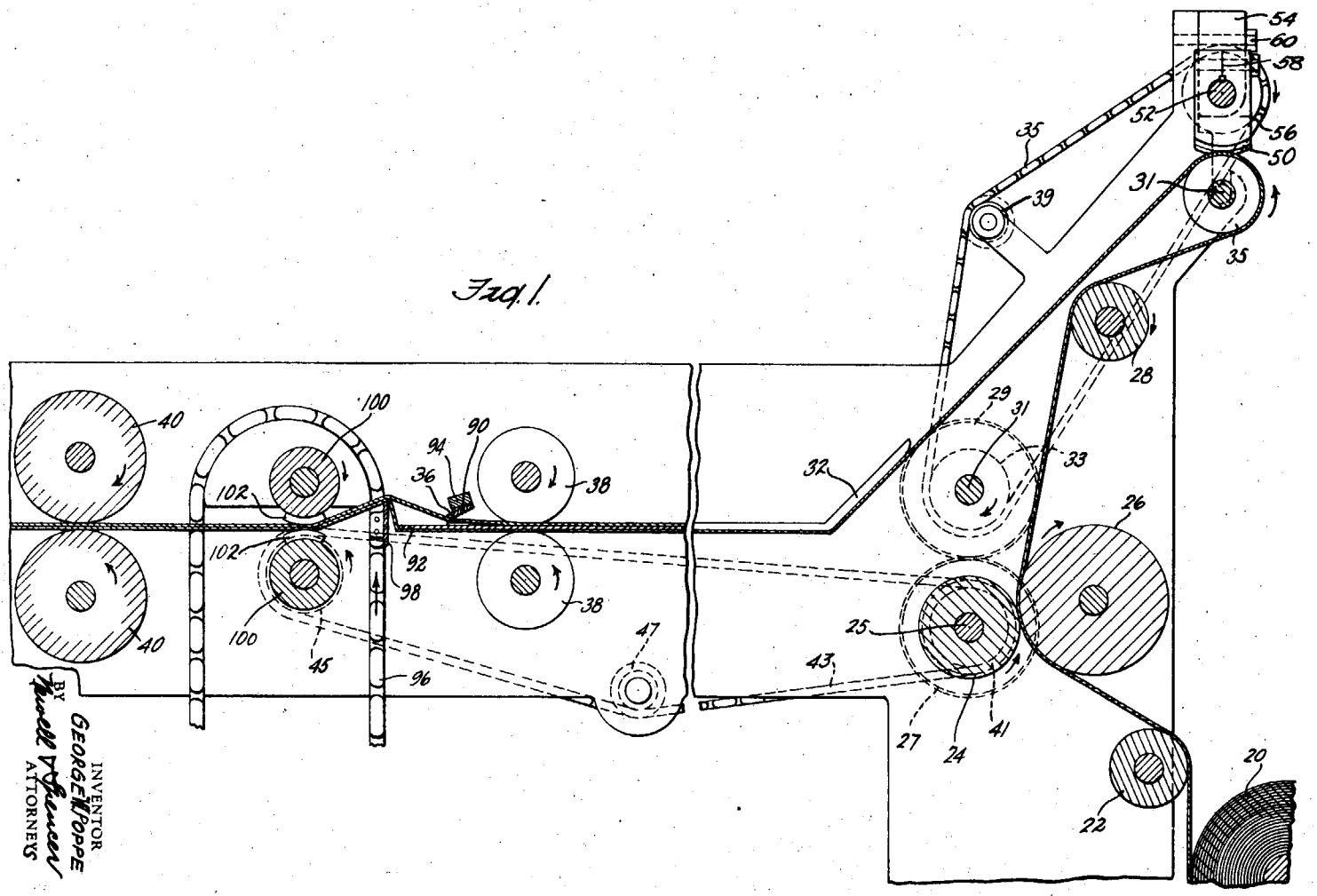
Figure 1 is a longitudinal sectional view of a paper bag machine showing the mechanism for carrying out the present invention attached thereto.

Before describing the new parts in detail, brief mention will be made of the more important parts of a known bag machine. Referring to Figure 1, the paper from which the bags are formed is fed as a web from a roller 20 over a guide roller 22 and between rollers 24 and 26 which may be feed rollers, but sometimes these rollers carry printing devices for printing suitable matter on the web of paper at such distances apart that it properly appears on each finished bag. The web then passes over a guide roller 28 and around a roller mounted on the shaft 31.

For the purpose of the present invention this roller is modified but in the usual machine such roller may be and frequently is an ordinary roller which serves to reverse the direction of the paper and deliver it to the folding and forming mechanism 32, whence it passes through the feed rollers 33 to the chopping mechanism designated generally by 36. This chopping mechanism severs the folded web transversely into bag lengths. The bag then passes on to folding and pasting mechanism not shown, which operate to fold over the bottom flap of the bag and paste it in the usual way.

In the process of making my improved bag the paper web is slit or die-cut at suitable intervals prior to the folding operation, said slits forming the edges of flaps in the finished bag. The means for doing this and other changes, in the known form of bag making machine, whereby a bag is made according to my new process, will now be described.

In Figure 1 of the drawings, the mechanism employed for forming the slits in the paper web is of the type known in the art as a die cutter and it comprises a pair of knives 50 secured to a shaft 52. Bearings 54 support the shaft 52 and said bearings are of a type which permits of adjustment of the shaft.

Figure 6:
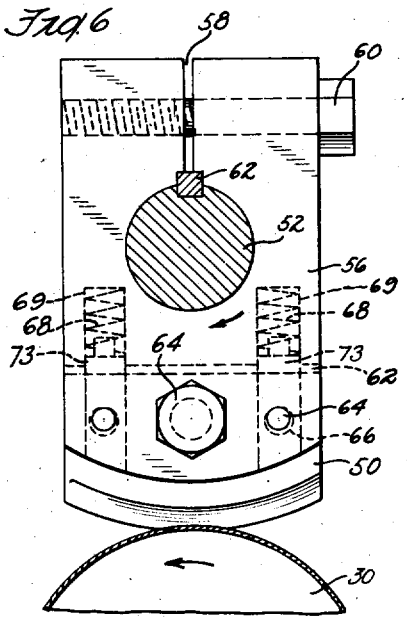
Figure 6 is a detail view partly in section of a form of a die cutting mechanism.
Figure 7:
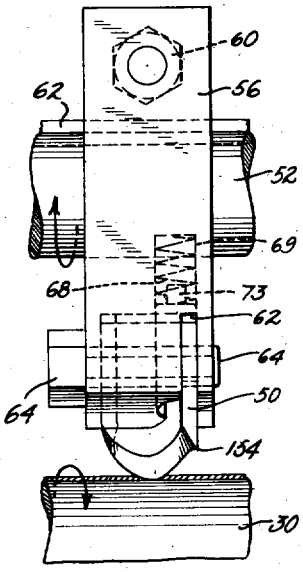
Figure 7 is a similar view taken at right angles to Figure 6.
Figure 8:
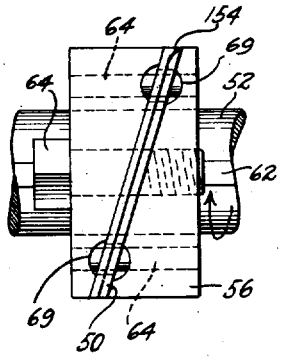
Figure 8 is a detail bottom plan view of the die cutting mechanism shown in Figures 6 and 7.

Each knife 50 is carried by a block or the like 56, see Figures 6 to 8, these blocks being preferably split as at 58 and secured to the shaft 52 by means of a bolt 60 and key 62. The blocks 56 are slotted as at 63 and the knives are slidably mounted in these slots, they being held therein by bolts, or similar means 64 which are carried by the blocks and which pass through openings 66 in the knives 50. It will be noted that the openings 66 in the knives 50 are slightly larger than the bolts 64 which construction permits of a slight movement of each knife 50 relative to the block by which it is carried. For the purpose of yieldingly mounting the knives, springs 68 are employed to force the knives outwardly of their blocks, said springs being mounted in recesses 69 in the blocks. Interposed between each spring and its respective knife there is a follower 73 which serves to transmit the pressure of the spring to the knife and thereby yieldingly maintain the knife extended into cutting contact with the surface of rollers 35, mounted on shaft 31. By mounting the knife in the above described manner sufficient pressure to properly cut the paper is obtained, and injury to the cutting edge of the knife by contact with the surface of the rollers 35 is prevented. By reference to Figures 6 to 8 of the drawings, it will be noted that the knives 50 are positioned at an angle with respect to their rotary path of travel and by this arrangement of the knives, the slits are formed in the web of paper at an angle to the longitudinal axis thereof which produces a closing lip for the finished bag, the end edges of which are angular, as in the form of bag shown in Figures 11 to 15 inclusive. It is to be understood that the angle at which the knives are positioned may be varied to produce any angle desired for the end edges of the closing lip.

Figure 2:
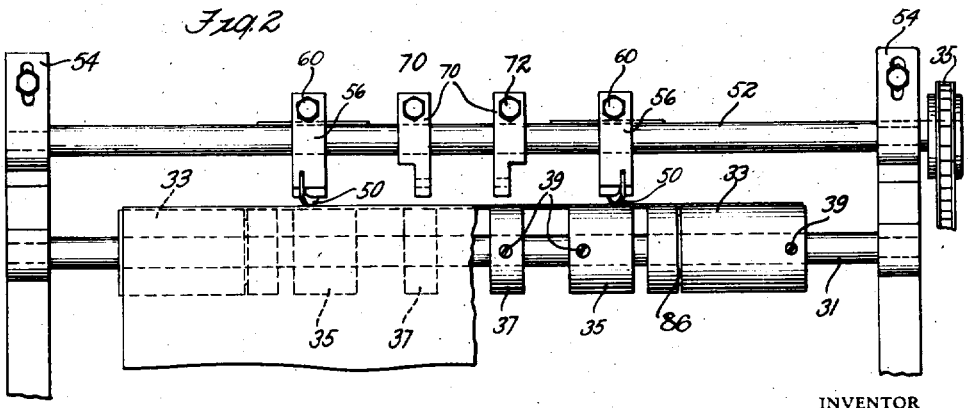
Figure 2 is a detail view in elevation of one type of attachment for forming the slits in the paper web.

As shown in Figures 2, the roller which in the usual machine is mounted on the shaft 31 is in the present invention replaced by a roller of the section type which, and preferably comprises end sections 33 and two pairs of intermediate sections, one pair of said intermediate sections being designated by the reference numeral 35, the other pair being designated by the reference number 37. These roller sections 33, 35 and 37 are adjustably carried by the shaft 31, and are secured thereon in their adjusted position by means of set screws 39. By this construction, it is readily apparent that the several sections of the roller together with the knives 50 may be adjusted to form slits in the web of paper at the proper distance apart transversely of the web.

It will be noted from Figure 2 that in addition, to the blocks 56 which carry the knives 50, the shaft 52 also carries a plurality of blocks 70. The specific construction of these blocks is shown in Figures 4 and 5 by reference to which it will be seen that each block is secured to the shaft 52 by means of a bolt 72 and a key 74. Each block is preferably cut out as at 76, and mounted in this cut out portion each block carries a knife 78. Each knife 78 is adjustably secured to its respective block by means of a bolt 80 which passes through a slot 82 in the knife, and has threaded engagement with the block as at 84. As shown in Figure 4, these knives are straight as distinguished from the knives 50 heretofore described and as shown in Figure 5, these knives 78 operate in peripheral grooves 86 in the end sections 33. This last described construction is known in the art as a slitting mechanism and its principal use in connection with the present invention is for forming straight slits in the paper web such as are shown in Figures 9 and 10 in the drawings.

Figure 3:
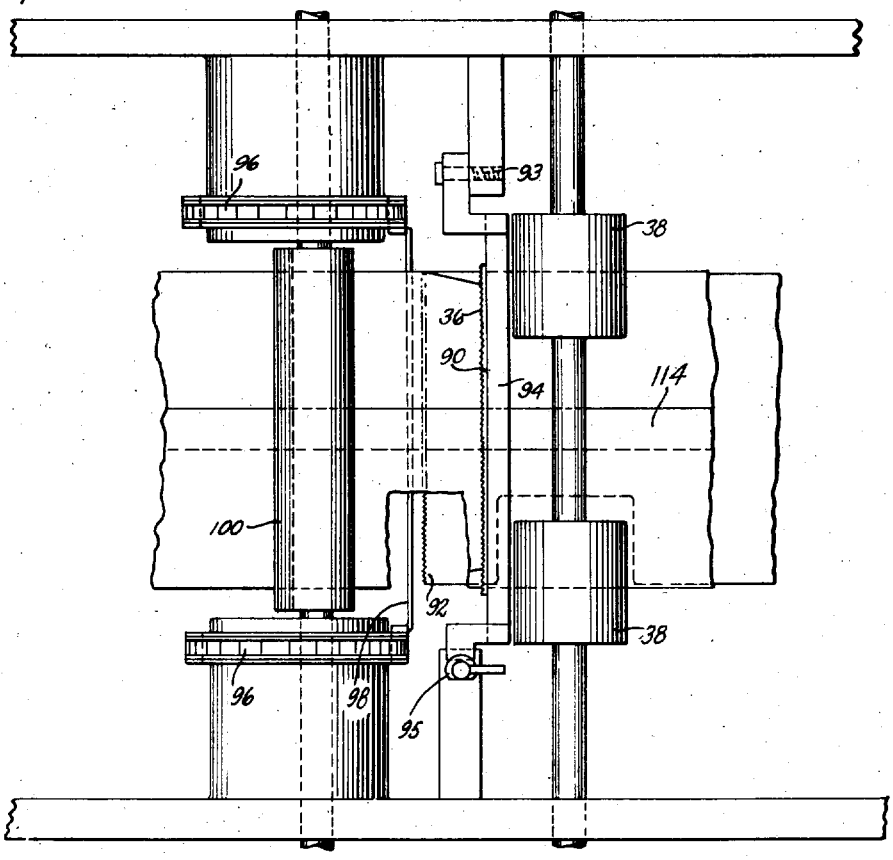
Figure 3 is a plan view of the chopping mechanism of a known type of paper bag machine.

The aforementioned chopping mechanism 36 preferably consists of two knives 90 and 92 which extend transversely of the machine as more clearly shown in Figures 1 and 3. The knife 90 is carried by a suitable support 94 arranged in such a manner that the knife occupies a slight angular position with respect to the travel of paper through the machine. The support 94 is pivotally secured at one end as at 93 to the machine, its other end being engaged by a suitable latch by means of which the support is held during operation against movement about its pivotal point. Loosening the latch 95 permits of swinging the support 94 about its pivotal point 93 for the purpose of clearing the machine should it become choked at this point. The knife 92 occupies a position which is parallel to the travel of paper through the machine and is positioned beyond the knife 90 as shown in Figure 1.

Suitably mounted on each side of the machine is an endless belt 96 and connecting these belts there is a transversely-extending bar 98. This bar 98 moves upwardly through the machine in proximity to the knife 92 and imparts a sharp upward blow to the folded paper web, the impact of which serves to sever the web transversely along its lines of engagement with both knives 90 and 92.

For proper operation of the chopping mechanism, the folded paper web should have a certain amount of slack therein when engaged by the chopper bar 98, and to provide this slack, pinch bars 100 are employed. These pinch bars each have a projection 102 and the folded paper web is gripped between these projections 102 as they come together as shown in Figure 1, it being understood that the pinch bars 100 are rotated at a speed which slightly retards the movement of the folded web of paper through the machine when it is gripped by the projections 102.

The feed roller 24 is mounted upon a shaft 25, and carried by this shaft in such a manner that it is rotated therewith, there is a gear 27. This gear 27 drives a gear 29 suitably mounted as at 31. Driven by the gear 29 there is a sprocket wheel 33 around which a driving chain 35 passes. This chain 35 also passes around a sprocket 37 mounted upon the shaft 52 and said shaft is rotated by the driving chain 35 which in turn is driven by the gears 27 and 29, and the sprocket 33. The driving chain 35 also passes around an adjustable idle sprocket 39 by means of which any slack in the chain 35 due to wear or adjustment of the shaft 52 may be taken up.

Mounted on the shaft 25, there is a sprocket 41 around which a chain 43 passes, and this chain 43 also passes around a sprocket 45 carried by the lower pinch bar 100. This chain 43 serves to drive the lower pinch bar 100, the upper pinch bar being driven from the lower pinch bar in any desired manner. For the purpose of taking up slack in the driving chain 43, an adjustable idle sprocket 47 is employed and is suitably mounted in frame of the machine.

Referring now to Figures 9 and 10, a description of one type of bag formed in accordance with the present invention will be given. The paper web is fed through the machine as heretofore described and as it passes around the roller 30 the paper web is provided with slits 110 at proper intervals in its length to form the size of bag desired. These slits 110 are parallel with the longitudinal axis of the web and are formed by the heretofore described slitting mechanism illustrated in detail in Figures 4 and 5. The paper web is then passed to the folding mechanism where it is folded upon the lines 112 in such a manner that the free edges overlap as indicated at 114 to form the bag body. After the web has thus been folded to form a tubular structure it is passed onto the chopping mechanism heretofore described where it is severed transversely along the lines 116 and 118 by the knives 90 and 92 respectively. After the tubular structure has been severed by the chopping mechanism a bag length such as 120 results. This bag length is provided on each end with a flap, the flap on one end being a prolongation of one side of the bag body, while the flap on the other end is prolongation of the opposite side of the bag body, this result being obtained by the position of the knives of the chopping mechanism. In Figure 9 these flaps are designated by the reference numerals 122 and 124. To complete the bag one of two flaps, preferably the flap 122, is folded over into engagement with the body portion of the bag and is permanently secured thereto by a suitable paste, it also being understood that the overlapping portions 114 of the bag body are also permanently secured together, preferably by means of paste. The flap 124 which may be called the free flap is employed for closing the bag when in use and this flap may or may not be provided with a gum or other suitable adhesive by which it may be retained in its bag-closing position.

From the foregoing it will be apparent that when the free flap 124 is folded over to close the bag owing to the shape of the flap and the manner in which it is formed a dust-proof closure is had, it being understood that the flap is folded transversely along its base line.

Figure 11:
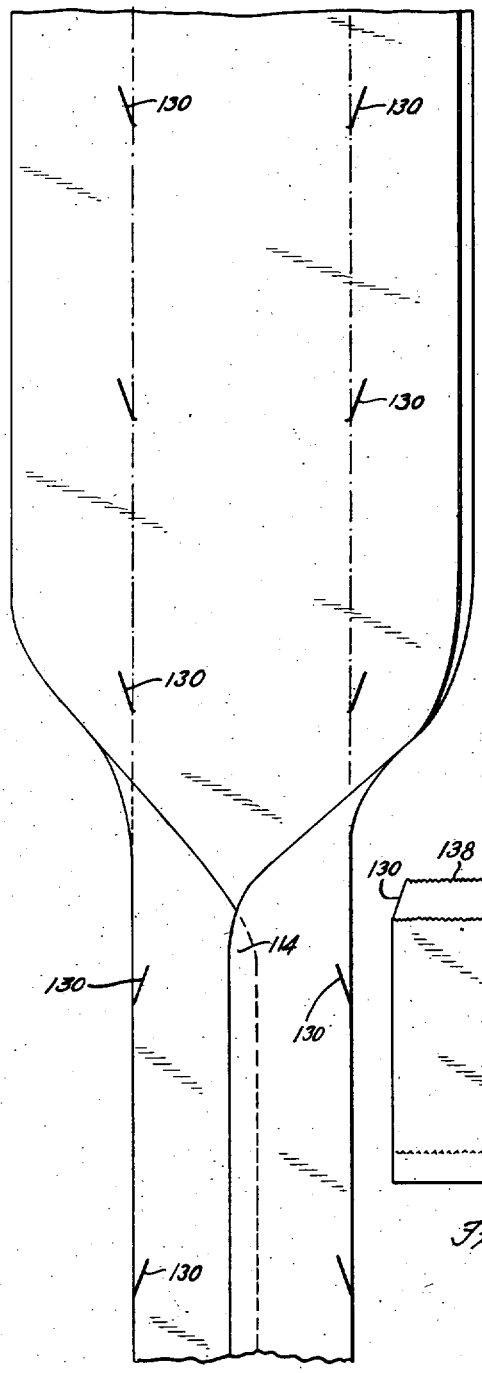
Figure 11 is a plan view of a web of paper similar to that shown in Figure 9 except that the slits are formed at an angle to the longitudinal axis of the web.
Figure 12:
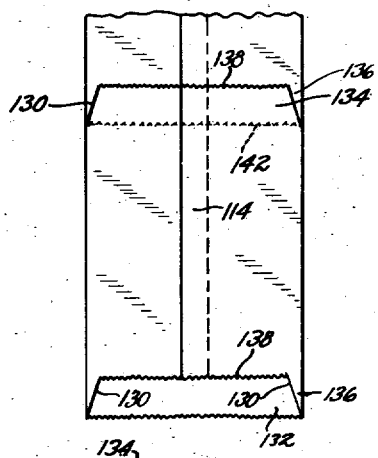
Figure 12 shows the manner in which a bag length is severed from the folded web.
Figure 13:
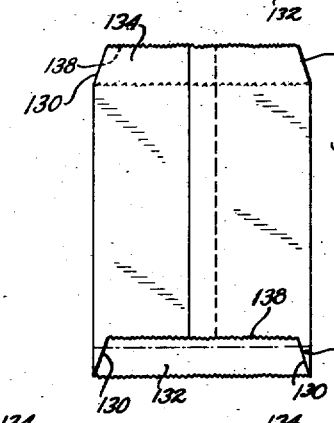
Figure 13 is a view of a severed bag length.
Figure 15:
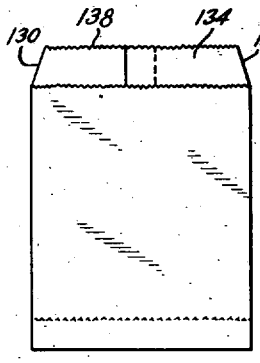
Figures 14 and 15 are reverse face views of a completed bag.
Figure 14:
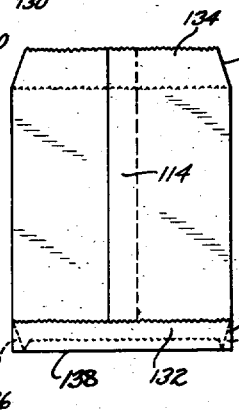

In Figures 11 to 15 inclusive is shown a slightly different type of bag in which the paper web is formed with slits 130 at equally distantly spaced intervals as it passes around the roller 30. These slits 130 are angularly disposed with respect to the longitudinal axis of the web and are formed by the die-cutting mechanism heretofore described and illustrated in Figures 6 to 8 inclusive. After the web is so formed it is folded in the manner heretofore described to form a tubuluar structure with overlying edges 114. This tubular structure is now subjected to the action of the chopping mechanism and severed into bag lengths such as shown in Figures 12 to 15 inclusive. It will be noted by reference to Figures 12 to 15 that the bag lengths have a flap at each end thereof and said flaps, as in the heretofore described bag lengths are a prolongation of the opposite sides of the bag lengths. In Figures 12 to 15 these flaps are designated by the reference characters 132 and 134. It will be noted that when the web is slit and folded as shown in Figure 11 and subsequently severed into bag lengths as shown in Figures 12 to 15, the side wall of each bag length opposite the flap 132 will be formed with a side wing portion 136 which serves to entirely close the bottom end of the bag length when the flap 132 is folded along the line 138. The free flap 134 of each bag length has angular end edges 130 which extend from the outer or free edge of the flap entirely to the base of the flap. When this flap 134 is folded over to close the bag in use the fold is made along the line 142 and owing to the end edges of the closing flap 134 extending clear to the base of the flap 134 or in other words, to the line of fold 142, a complete and dust-proof closure at the corners of the bag body is had.

In Figures 16 to 19 inclusive is shown a slightly modified form of the invention and in this form the slits such as 150, which are formed in the web of paper, are provided at their ends with curved portions 152. These curved portions may be formed preferably by slightly curving the knife as at 154, as shown in Figure 7 of the drawings and the purpose of thus forming the slits is to prevent a ragged edge known in the art as a "tatter" which often occurs at the juncture of the side fold and the transverse cut of the chopping mechanism and is due to the knives of the chopping mechanism not accurately coinciding with the ends of the slits. This may also result from an inaccurate folding of the web with respect to the slits 150 formed therein and therefore by extending the ends of the slits inwardly of the web so that they extend slightly beyond the longitudinal line of fold, all possibility of tearing in such a manner as to produce the so-called "tatter" is obviated. Another advantage resulting from this form of cut is that when the lip of the bag is folded over small gussets are produced at the bag corners thereby more effectually protecting the bag contents from dust.

From the foregoing it will be apparent that the present invention provides a new and improved paper bag in which the closing flaps or lips are so constructed as to assure at all times a dust-proof closure for the bag and furthermore the invention provides a new and improved method for manufacturing bags of this character and a new and improved machine for carrying out the new and improved method. It is to be understood that the invention is not limited to the particular illustrated embodiments herein but that the invention may be produced in such other forms as rightfully fall within the scope of the claims hereto annexed.

What is claimed as new is:

1. The method of making an envelope bag, which comprises taking a bag tube, which has longitudinal cuts at intervals in the length thereof, and severing both walls of the tube along lines which connect both ends of the cuts.

2. The method of making an envelope bag from a web of paper having longitudinal cuts at intervals in the length thereof, which comprises folding the web to form a tube, and completely severing the walls of the tube along lines which connect both ends of the cuts.

3. The method of making envelope bags, which comprises making cuts in a web of paper at substantially bag length intervals along the length thereof, said cuts separated transversely a distance corresponding to the width of the closing flap in the finished bag, folding said web to form a bag tube having front and rear walls and subsequently completely severing both walls of the bag tube along lines which connect the respective ends of the cuts.

4. The method of making envelope bags which comprises making cuts in a web of paper at substantially bag length distances along the length thereof, said cuts separated transversely a distance corresponding to the width of the free flap in the finished bag, folding said web to form a bag tube having front and rear walls and subsequently completely severing one tube wall along a line connecting the cuts at one end thereof and the other tube wall along a line connecting the other ends of the cuts.

5. The method of forming paper bags which comprises cutting a web of paper to provide relatively short transversely spaced slits at equidistantly spaced intervals in the length thereof, folding said web of paper to provide a front wall and a rear wall in the finished bag, severing both walls of the longitudinally folded web transversely along lines which meet both ends of the slits, and subsequently closing one end of the severed portion.

6. The method of forming paper bags which comprises cutting a web of paper to provide relatively short angularly disposed slits at equi-distantly spaced intervals in the length thereof, said slits being spaced apart transversely a distance substantially equal to the width of the finished bag, folding said web of paper to provide a front wall and a rear wall in the finished bag, severing both walls of the folded web of paper transversely along lines which meet both the ends of the slits, and subsequently closing one end of the severed portion.

7. The method of forming paper bags which comprises cutting a web of paper to provide relatively short slits at equi-distantly spaced intervals in the length thereof, folding said web of paper to provide a front wall and a rear wall in the finished bag, simultaneously severing the folded web of paper transversely at along lines which meet both the ends of the slits, and closing one end of the severed portion.

8. In a machine for making an envelope bag having a closing flap, the combination with the web-feeding and web-folding mechanisms thereof; of chopping knives for severing both walls of the bag tube, rotary cutters for making cuts in the web of paper prior to folding so spaced that the cuts form the sides of the closing flap of the finished bag, said chopping knives being separated from each other such a distance and the knives being of such length that the walls of the bag tube are severed by said knives along lines that meet both ends of the cuts.

9. The method of forming a bag from a web, comprising cutting slits in the web in oppositely arranged pairs spaced from the edges of the web, folding the edges of the web to form a tube, and cutting the tube by transverse cuts on opposite sides thereof, said cuts connecting the opposed ends of the slits.

10. The method of forming a bag from a web, comprising cutting slits in the web in oppositely arranged pairs spaced from the edges of the web at opposite sides of the center line of the web, folding the edges of the web to form a tube, cutting the tube by transverse cuts on opposite sides thereof, said cuts being out of register and connecting the opposed ends of the slits to form a tab at the end of the bag.

11. Apparatus for forming bags or the like, comprising a support for a roll of material, a slitter roll over which the material passes, diagonally arranged blades on the roll, a former, and means to draw the material over and wrap it around the former to form a tube, the edges of the former, if extended, intersecting the blades.

12. A machine embodying the features of claim 11, together with transverse cutters to sever blanks from the leading end of the tube.

13. Apparatus for forming bags or the like, comprising a support for a roll of material, cutters for forming cuts in the material spaced inwardly from the edges thereof, said cuts being located angularly in respect to the general direction of the web, a former, means for drawing the web over the former to form a tube, and transverse cutters to cut both walls of the tube from opposite ends of the cuts.

14. Apparatus for forming bags or the like comprising a support for a roll of material, a former, means for wrapping the material about the former to make a tube, means for cutting both walls of the tube transversely to form individual blanks from the leading end of the tube, and means for forming cuts in the material running in a general longitudinal direction prior to making the transverse cuts, the transverse cuts meeting the opposing ends of the longitudinal cuts.

15. The process of making bags from a web without waste, comprising forming spaced pairs of slits in a web, folding the web along longitudinal lines which intersect the slits and cutting both walls of the tube by transverse cuts which connect both ends of the slits to thereby form a bag tube.

16. The process of making bags which comprises making cuts in a web of material, said cuts having curved ends, folding the web to form the bag tube and severing both walls of the tube along lines that meet opposite ends of the cuts.

17. A paper bag having a front wall, a rear wall and side folds, a top flap which is a prolongation of one of said walls, said flap having side edges which are prolonged beyond the side folds of the bag.

18. A paper bag having front and rear walls and side folds, a flap at the mouth of the bag adapted to be folded over onto one wall thereof to close the bag mouth, the sides of the flap meeting the top edge of one bag wall beyond the folded edges of the bag, thereby forming gussets at the top corners of the bag when the flap is folded over.

GEORGE W. POPPE.